(12) United States Patent
Ferguson

(10) Patent No.: US 11,122,125 B2
(45) Date of Patent: Sep. 14, 2021

(54) MODULAR CONTROLLED NETWORKING SYSTEM FOR AIRCRAFT INFLIGHT ENTERTAINMENT, COMMUNICATION AND CABIN MANAGEMENT

(71) Applicant: Gulfstream Aerospace Corporation, Savannah, GA (US)

(72) Inventor: Johnny Ferguson, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 73 days.

(21) Appl. No.: 16/737,086

(22) Filed: Jan. 8, 2020

(65) Prior Publication Data

US 2021/0211500 A1    Jul. 8, 2021

(51) Int. Cl.
*H04L 29/08* (2006.01)
*H04L 12/10* (2006.01)
*H04L 12/40* (2006.01)
*H04L 12/853* (2013.01)
*H04L 29/06* (2006.01)

(52) U.S. Cl.
CPC .............. *H04L 67/12* (2013.01); *H04L 12/10* (2013.01); *H04L 12/40* (2013.01); *H04L 47/2416* (2013.01); *H04L 65/4069* (2013.01); *H04L 2012/4028* (2013.01)

(58) Field of Classification Search
CPC .......... H04L 67/12; H04L 12/10; H04L 12/40
See application file for complete search history.

(56) References Cited

U.S. PATENT DOCUMENTS

| 7,908,042 B2* | 3/2011 | Brinkley | G08G 5/0013 |
| | | | 701/3 |
| 8,212,381 B2* | 7/2012 | Riedel | H02J 13/0003 |
| | | | 307/3 |
| 2020/0198805 A1* | 6/2020 | Bruchmann | B64D 11/0015 |

\* cited by examiner

*Primary Examiner* — Chandrahas B Patel
(74) *Attorney, Agent, or Firm* — LKGlobal | Lorenz & Kopf, LLP

(57) ABSTRACT

The modular networking system supplies data and aircraft power to an inflight entertainment, communication or cabin management device within the aircraft. At least one universal module package for placement within the passenger cabin carries an Ethernet switch which has a processor programmed to support deterministic networking, such as according to AVB/TNS protocols. Devices within the cabin are attachable to ports on the Ethernet switch. A power converter circuit and power injector circuit within the module package supply power to devices attached ports on the Ethernet switch. A microcontroller-controlled circuit switch selectively admits or inhibits supply of power attached devices in response to the received control data from the avionics system.

16 Claims, 5 Drawing Sheets

MODULAR CONTROLLED NETWORKING SYSTEM FOR AIRCRAFT INFLIGHT ENTERTAINMENT, COMMUNICATION AND CABIN MANAGEMENT

TECHNICAL FIELD

The disclosure relates generally to aircraft distribution networks, and associated cabling and wiring, used to provide video, audio, data, command, control and power for inflight entertainment, communications and cabin management. More particularly the disclosure relates to aircraft distribution systems having a modular architecture to facilitate deployment of customized floorplans within the aircraft.

BACKGROUND

This section provides background information related to the present disclosure which is not necessarily prior art.

Inflight entertainment systems, cabin management systems and onboard communications systems have traditionally been separate monolithic systems, with little integrated backbone functionality. As such, these conventional systems have required separate distribution networks for each of the video, audio, data, command, control, and power functions. This has led to a proliferation of wiring, adding weight and complexity to the aircraft. With this increased complexity comes increased wiring installation and troubleshooting times, and the need to use multiple different tool types.

SUMMARY

The disclosed modular networking system for aircraft utilizes a special purpose Ethernet switching circuit to implement a deterministic network that will support a range of inflight entertainment, cabin management systems and onboard communication functions. Universal modular switching circuits distribute audio, video, data, command and control and power over a common Ethernet wiring architecture to create a modular distribution system. These universal modular switching circuits may be connected to form a federated routing system that allows multiple offboard links to be aggregated, and provides redundancy of offboard connectivity through virtual router redundancy protocol. The power distribution over the Ethernet is controlled by these universal modules, which incorporate circuit breaker functionality that will dynamically monitor current, voltage, and connectivity of loads. The modular networking system supports a centralized management software platform which allows dynamic addressing of network nodes and assignment of functionality through software distribution.

According to one aspect, the disclosed modular networking system supplies data and aircraft power to an inflight entertainment, communication or cabin management device within the aircraft. The aircraft is of the type having a passenger cabin, a cockpit, an aircraft power source, and an avionics system supplying control data. Included in the modular networking system is at least one universal module package for placement within the passenger cabin. Disposed within the universal module package is an Ethernet switch which has a processor programmed to support deterministic networking and further has at least one port adapted to attach to an inflight entertainment, communication or cabin management device.

A power converter circuit disposed within the universal module package is adapted for coupling to receive aircraft power from the aircraft power source. The power converter circuit supplies output power at a current flow type (e.g., direct current) and voltage corresponding to the power requirements of an attached inflight entertainment, communication or cabin management device. A power injector circuit disposed within the universal module package is coupled to the power converter circuit and to the Ethernet switch to supply power to an inflight entertainment, communication or cabin management device.

A microcontroller-controlled circuit switch, also disposed within the universal module package, is operable to selectively admit or inhibit supply of power through the port to the attached inflight entertainment, communication or cabin management device. The microcontroller, coupled to the circuit switch and disposed within the universal module package, is adapted to receive control data from the avionics system and is programmed to operate the circuit switch to selectively admit or inhibit supply of power through the port to the attached inflight entertainment, communication or cabin management device in response to the received control data.

BRIEF DESCRIPTION OF THE DRAWINGS

The drawings described herein are for illustrative purposes only of selected embodiments and not all possible implementations. Thus the particular choice of drawings is not intended to limit the scope of the present disclosure.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

In the commercial business jet market a customer, purchaser or interior designer will often want to specify a particular floorplan layout, such as what types of inflight entertainment systems and communications systems are desired and where they should be located. Similarly the customer, purchaser or interior designer may also want to specify how the cabin management systems should function. For example, one area of the aircraft may need to be dimmed for sleeping, in which case the cabin management system is capable of dimming overhead lights, darkening the windows and illuminating pathway lighting. At the same time another area of the aircraft may need to be well lit and outfitted for a teleconference using audio-video systems and communication systems.

It is of course possible to custom build these features into each commercial business jet when the aircraft is ordered, but such customization typically results in the addition of unwanted extra weight, a longer and more tedious interior design process and a longer fabrication time. In markets where every business jet is a custom order, there has heretofore been little opportunity for engineering reuse.

The disclosed modular networking system addresses this problem by providing a universal multipurpose interconnection module (universal module), featuring a straightforward, universal interface. The module is versatile and adaptable to a wide variety of different uses, allowing it to form the backbone of a scalable interior cabin design.

Figure 1:
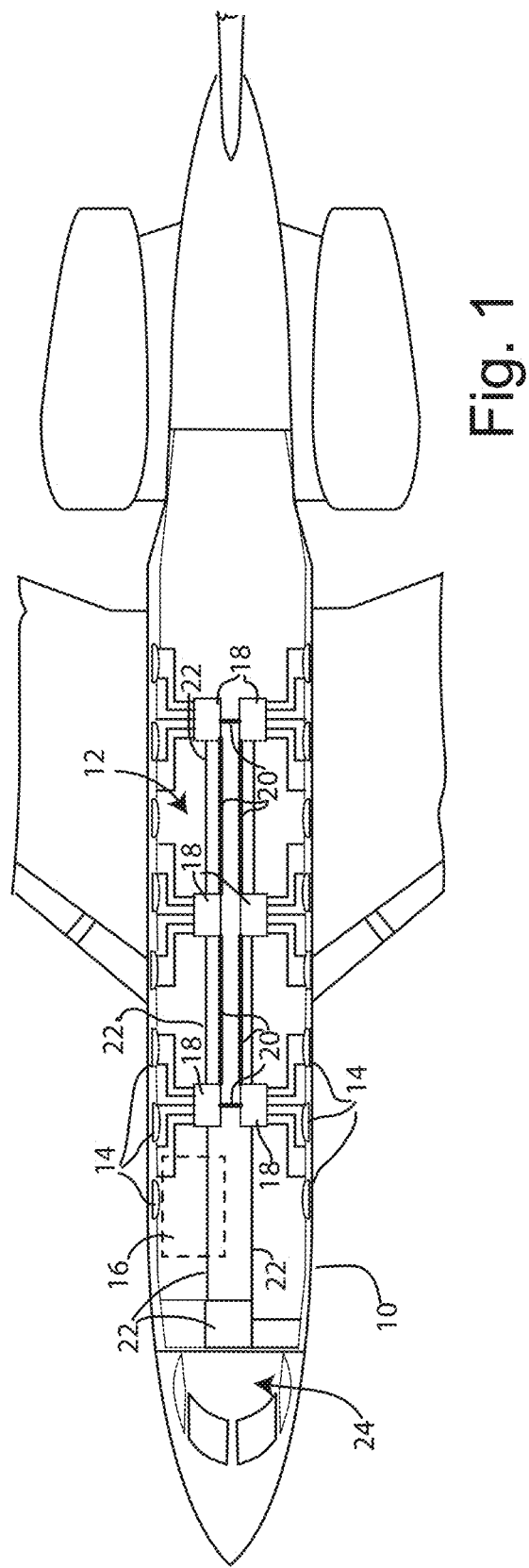
FIG. 1 is a cutaway plan view of an exemplary aircraft cabin in which the disclosed modular system is deployed.

Referring to FIG. 1, aircraft 10 is illustrated in cutaway plan view to reveal the interior cabin space 12. A series of windows 14, typically disposed on both sides of the cabin, afford passengers an outward view. The placement of these windows typically defines different regions within the cabin where seating, sleeping berths, entertainment systems, dining platforms and the like are arranged. FIG. 1 shows an entertainment system monitor 16, located in the forward part of the cabin; but thanks to the modular nature of the disclosed system, the monitor 16 could just as readily have been located in the aft part of the cabin (or in multiple locations).

In FIG. 1 a plurality of universal, multifunction interconnection modules 18 (hereinafter universal module 18) form the backbone of the disclosed modular networking system. These universal modules 18 are coupled to each other in a loop circuit 20, preferably implemented using fiberoptic cable. The universal modules 18 are also coupled to a common aircraft power bus 22, running the length of the cabin and extending into the cockpit 24. On a typical business jet, the aircraft power bus carries both 28 VDC and 115 VAC. Each universal module 18 plugs into the power bus 22, to obtain power needed to energize the various circuits within the universal module itself, and to power devices attached to the universal module, as will be described below in connection with FIGS. 2 and 3. The universal modules 18 are also coupled to a common communication bus 21 carrying discrete input-output (I/O) control signals, hereinafter the discrete I/O bus 21 (shown in FIGS. 2 and 3). The discrete I/O bus is routed the length of the cabin and into the cockpit 24, typically by routing it parallel with power bus 22.

Universal Modules

Figure 2:
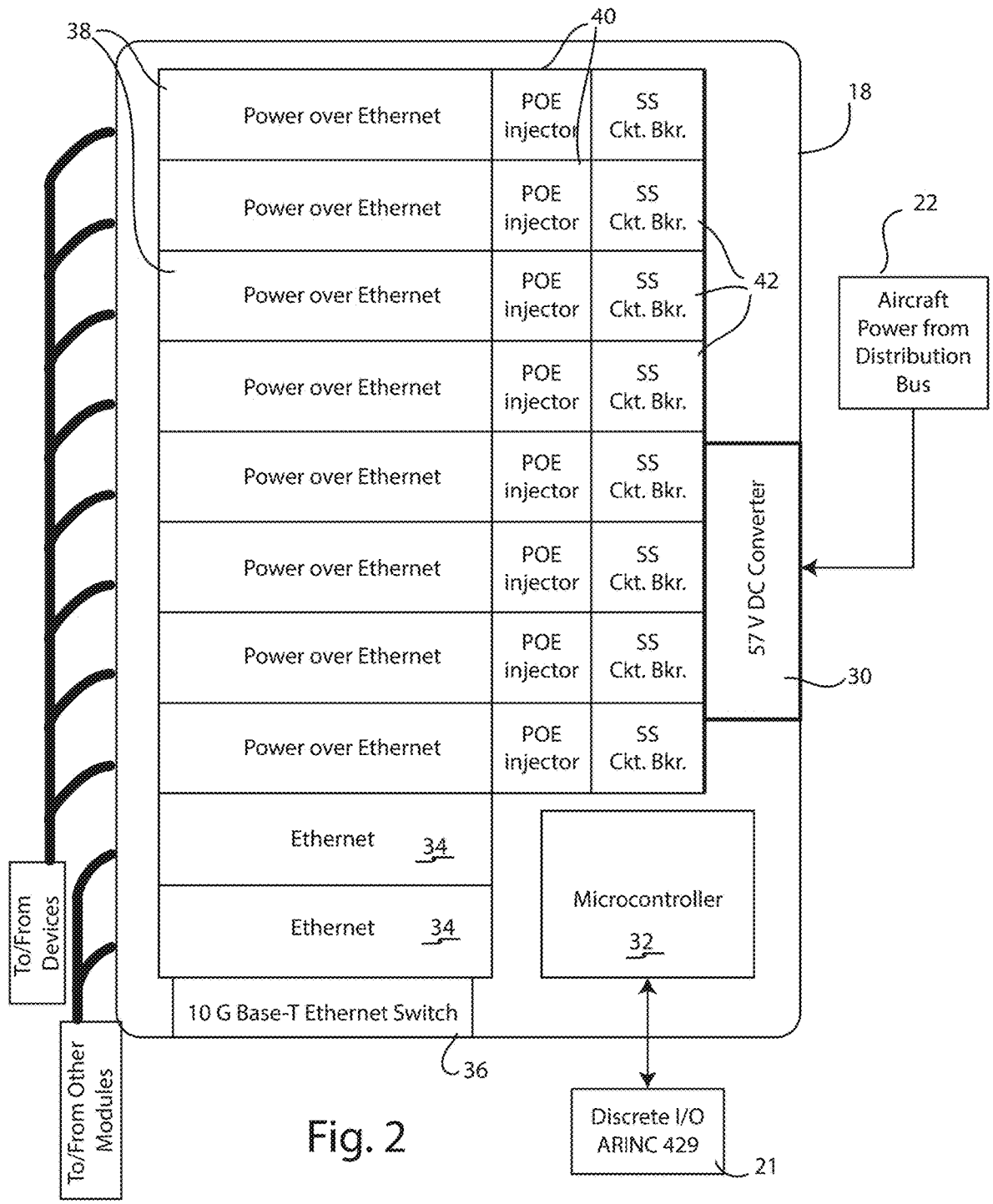
FIG. 2 is a block diagram of a universal multipurpose interconnection module in accordance with the disclosed concepts.
Figure 3:
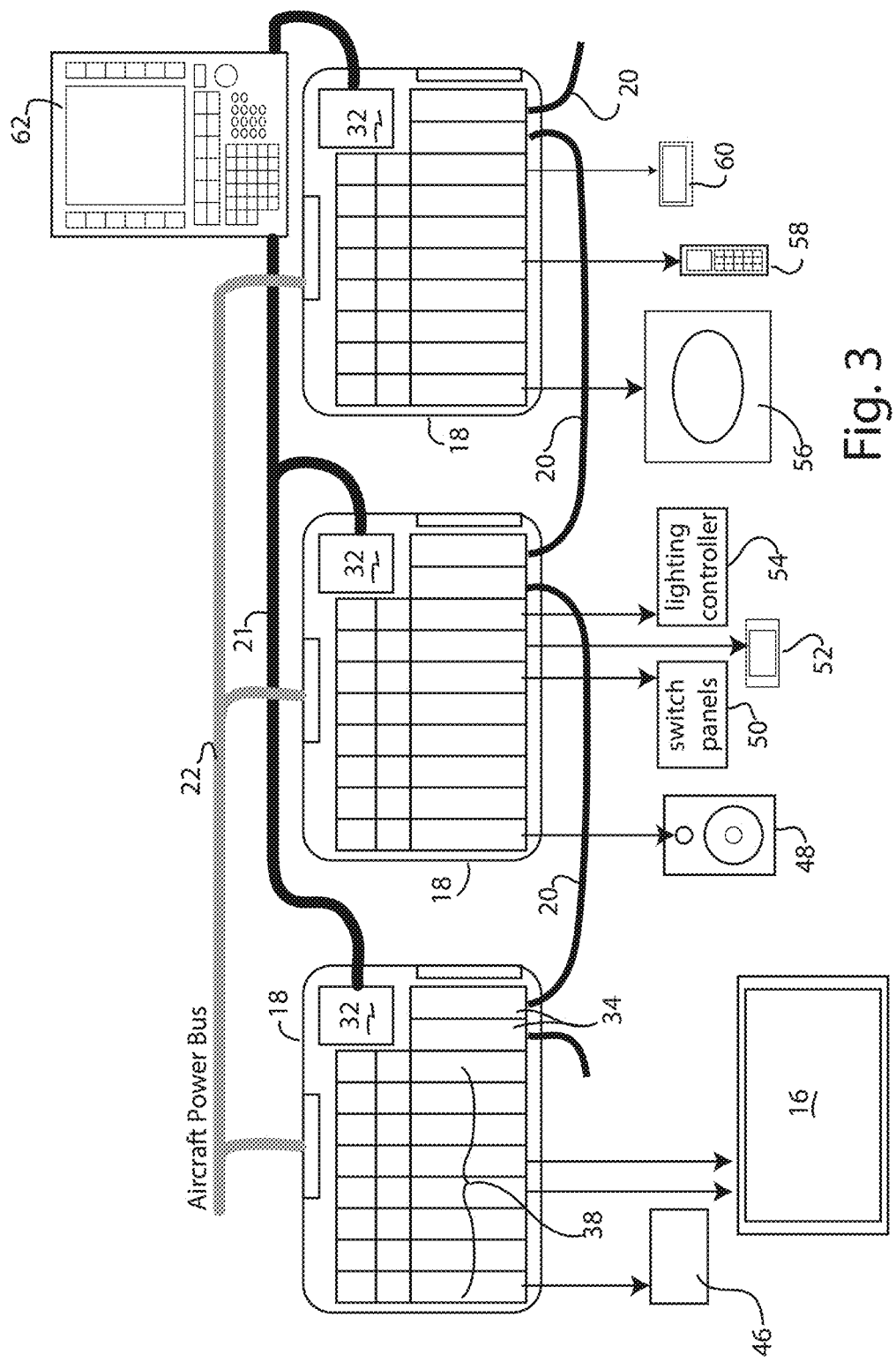
FIG. 3 is a wiring diagram illustrating a plurality of universal multipurpose interconnection modules in use with an assortment of on-board aircraft systems.

FIG. 2 shows the universal module 18 in greater detail. The universal module 18 includes a DC converter 30, to which the aircraft power bus 20 is coupled. In the illustrated embodiment the converter converts the 115 VAC from the aircraft power bus into 57 volts DC. The 57 volt DC level is then used to supply power over Ethernet and further regulated down, by the converter 30, to other voltages, as needed by other circuits within the universal module (e.g., 5 VDC to supply microcontrollers and other logic circuits). Other voltage embodiments are also possible. The universal module 18 also includes a microcontroller 32 which communicates with the discrete I/O bus 21. A pair of Ethernet circuits 34 provide connectivity both to and from other universal modules 18. In this regard, FIG. 3 illustrates how three universal modules are communicatively tied together in a daisy chain configuration via these Ethernet circuits 34. In the illustrated embodiment of FIG. 1, where the modules 18 are interconnected by the loop circuit 20, these Ethernet circuits 34 are outfitted to communicate as part of the fiber optic loop circuit 20.

The Ethernet circuits 34 are components of the Ethernet switch 36, shown diagrammatically in FIG. 2. The Ethernet switch 36 also provides connectivity with a bank of additional Ethernet circuits 38 that provide power over Ethernet (POE) to devices connected thereto. In FIGS. 2 and 3, the universal modules each have eight of these additional POE Ethernet circuits 38 (a greater or lesser number of POE Ethernet ports may be implemented if desired). As illustrated, each POE Ethernet circuit receives power from a dedicated POE injector 40. Each POE injector is, in turn, coupled to receive power from the DC converter 30 via a solid state (SS) circuit breaker 42, which supplies the 57 VDC from the converter 30. This arrangement supplies each of the power over Ethernet circuits with its own dedicated and fused power source. Thus a short circuit or other over-current condition of one of the attached devices will simply open the dedicated circuit breaker 42 for that Ethernet connection, without affecting other devices attached to the universal module.

FIG. 3 shows an exemplary configuration where three universal modules 18 are daisy chained together by fiber optic cables forming part of the loop circuit 20. The modules are also coupled to the aircraft power bus 22 and their respective microcontrollers 32 are in communication with one another via the discrete I/O bus 21. As illustrated, a wide assortment of in-flight entertainment system devices and cabin management systems can be connected to whichever universal module 16 is conveniently located, and these universal modules can readily be placed anywhere along the aircraft power bus 20 and discrete I/O bus 22.

To illustrate, FIG. 3 shows the following exemplary devices, each attached to one of the power over Ethernet circuits: legacy control circuit 46, entertainment system monitor 16, loudspeaker 48, switch panel 50, game player console 52, lighting controller 54, electronically dimmable window 56 (operable by liquid crystal or other light occluding mechanism), dedicated phone device 58 and a personal smartphone device. These are merely examples, as a multitude of different types of devices may be attached.

To take full advantage of the modular networking system, attached devices will be preferably capable of interfacing with the provided POE Ethernet ports. In the case of audio/video content, because the content is being delivered as Internet protocol (IP) packets, devices that consume such audio/video over IP will be equipped with a suitable AV receiver circuit that transforms the incoming audio/video data into a form usable by the consuming device. For example, the AV receiver circuit might convert incoming audio/video data into an HDMI format. In a similar fashion, devices that create audio/video content may need to be equipped with a suitable AV transmitter circuit that transforms the created content into IP packets that can be carried by the Ethernet network, and routed by the Ethernet switch 36 within each universal module 18. If desired an AV transceiver circuit may be included with the system, to perform the necessary format conversions between legacy audio/video components and the AVB/TSN Ethernet network mediated by the Ethernet switches 36. Format conversion effected by these AV receiver, transmitter and/or transceiver circuits preferably occurs at the point of input or output. This overcomes cable length limits often encountered with legacy devices, as the connection between the device and its associated AV transmitter, receiver and/or transceiver can be kept short.

While most of the devices listed above relate to entertainment and cabin management functions, the universal module is also capable of interconnecting with avionic components normally found in the cockpit. Thus illustrated in FIG. 3 is a flight management system (FMS) console. The flight management system is a specialized computer that automates a variety of in-flight tasks, a primary task being management of the aircraft's flight plan. While this information us important to the pilot and co-pilot, certain data available to the FMS, such as the aircraft's current position along its flight path, may be supplied to the passengers in the cabin for their information via the disclosed modular networking system.

Figure 5:
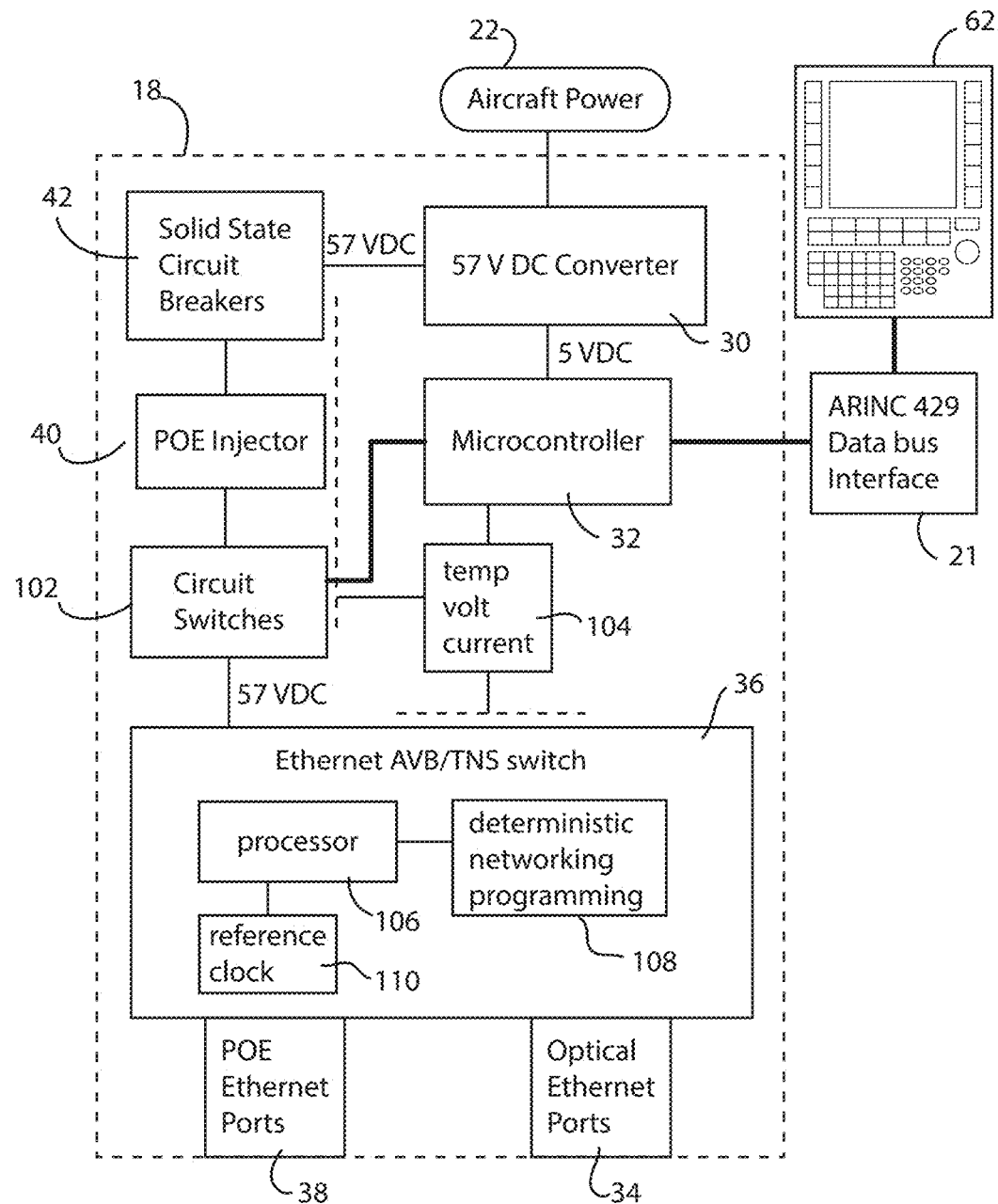
FIG. 5 is an electronic block diagram of the universal module in conjunction with certain supporting aircraft components.

There is perhaps an even more important aspect of the provided connectivity between the universal modules 18 and avionics systems, such as the FMS console. Connectivity gives the pilot, copilot or automated systems within the aircraft avionics and power systems, the ability to selectively control aircraft power being delivered to connected systems within the cabin. Such selective control is provided through the discrete I/O bus interface 21 (FIG. 5) that transports control signals to the microcontroller 32 of each universal module 18. As illustrated in FIG. 5, the microcontroller 32 has digital control over the circuit switches 102. If the pilot (or an automated system within the aircraft avionics and power systems) determines that more aircraft electrical power is needed for flight-critical purposes, the pilot or automated system can issue commands to the microcontrollers 32 via the discrete I/O bus to selectively shut down some or all of the devices being supplied power from the POE injectors 40. The POE injector circuits are individually controlled by the circuit switches 102. The circuit switches 102 gives the pilot and automated systems great control over which devices to shed when the need arises. For example, in a mission critical situation, where cabin power usage needs to be reduced, the pilot could selectively shut down the in-flight entertainment systems, while leaving a certain portion of the audio-video equipment functioning to allow an important ongoing video teleconference to proceed until finished.

Details of the Switched Ethernet Used in the Universal Modules

Figure 4:
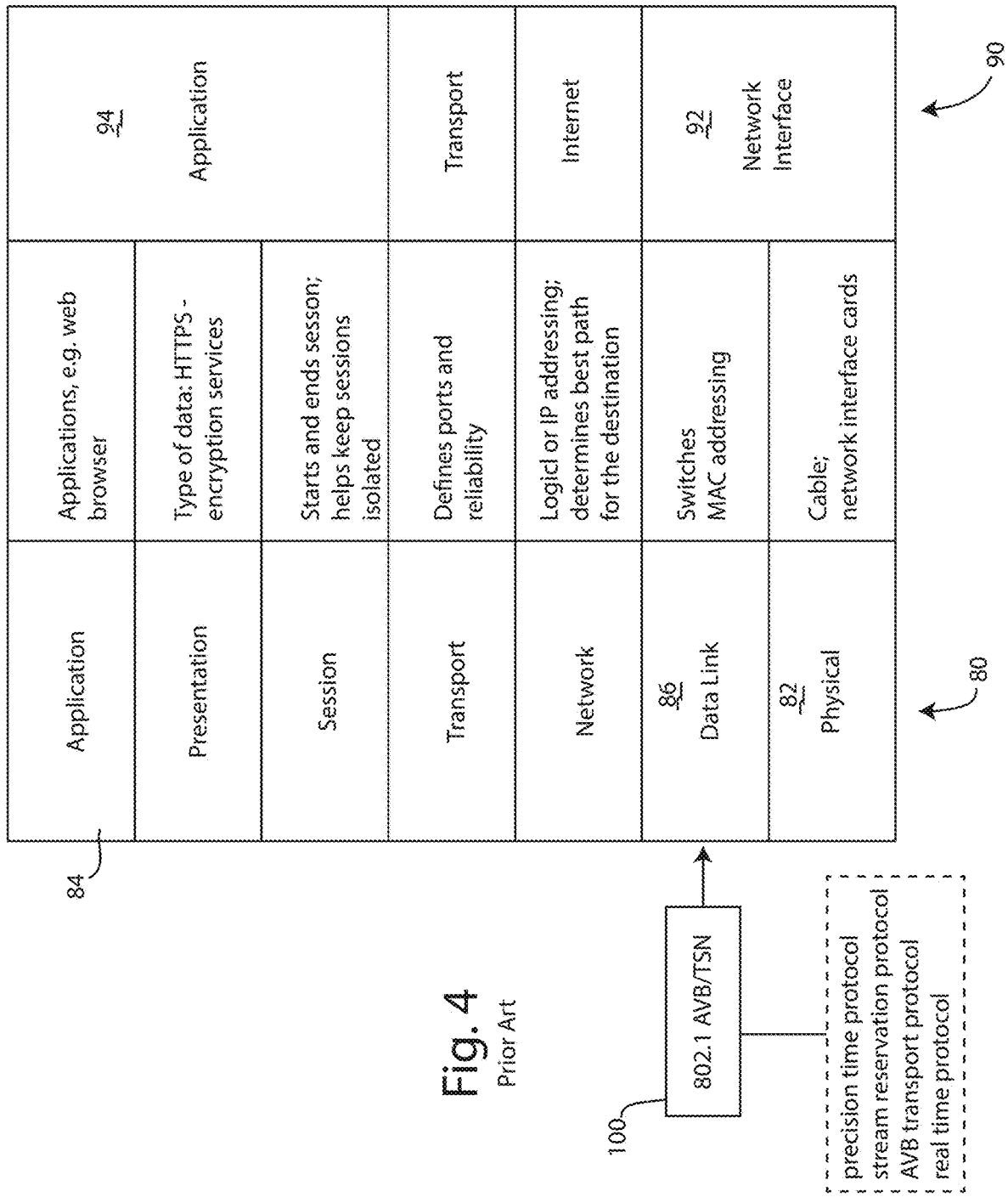
FIG. 4 is a chart showing the OSI and TCP/IP interconnection models, useful in understanding certain aspects of the disclosed system.

At the core of the universal modules 18 and the modular networking system using these modules, lies a special switched Ethernet network that works by introducing modifications to the OSI data link layer, as illustrated in FIG. 4. The OSI interconnection model, developed by the International Organization for Standardization (ISO), provides a seven layer model that characterizes and organizes different communication functions according to internal structure and technology used. Illustrated at 80 in FIG. 4, the layered nature of the OSI model can be seen. At the bottom is the physical layer 82, responsible for transmission and reception of unstructured raw data between a device and a physical transmission medium. Cables and network interface cards are examples of devices that operate primarily in the physical layer. At the top of the OSI model 80 is the application layer 84. This layer is closest to the end user. It governs software applications that provide a communication function. An example of such software application is the familiar web browser.

Of particular importance to the switched Ethernet network of the disclosed modular networking system is the data link layer 86. The data link layer provides node-to-node data transfer between two directly connected nodes. The data link layer is responsible for detecting and possibly correcting errors that may have occurred in the physical layer 82. Thus the data link layer lies immediately adjacent the physical layer 82.

Ethernet is a popular networking technology, commonly used in local area computer networks. A significant portion of the Ethernet technology resides in the physical layer 82, describing the wiring and signaling used. When originally introduced Ethernet used coaxial cable as a shared medium for communication. Later twisted pair copper lines and fiberoptic cables supplanted the coaxial cable. Another significant portion of the Ethernet technology resides in the data link layer 86, describing how streams of data are coordinated. Under the Ethernet protocol, communicating Ethernet stations send each other data packets that are labeled with a MAC address used to specify both the source and destination of the data packets. According to the Ethernet data link layer protocol, the Ethernet data packets are packaged into data units called frames, comprising a header, the payload, a frame check sequence.

While still important to computer scientists, the full seven layer OSI model has been represented in a more compact form, known as the TCP/IP model, shown at 90 in FIG. 4. In the TCP/IP model, the physical and data link layers are combined into the network interface layer 92. Similarly, the session, presentation and application layers of the OSI model are combined into a single application layer 94. The Internet today is based on this TCP/IP model. Thus the Ethernet technology discussed above belongs to the network interface layer 92 of the TCP/IP model.

The Internet, and the vast majority of local area networks are designed to work on a best effort delivery basis. Traffic is delivered from source to destination, but there is no guarantee that the traffic will be delivered in a timely fashion. Therein lies one of the big differences between the Internet-based network connections of today and the land-line circuit switched telecom networks of yesterday. The connections of land-line circuits were point-to-point circuits. Once the switched connection was made, traffic could flow from source to destination at nearly the speed of light, without interruption. In todays' Internet network, there are no point-to-point circuits, but rather a fabric of interconnected nodes that deliver traffic in labeled packets, on a best effort (but not time-guaranteed) basis.

Seeking to address this best effort shortcoming, the 802.1 Higher Layer LAN Protocols Working Group of the IEEE (Institute of Electrical and Electronic Engineers) has proposed changes in the way Ethernet is handled, to allow time-critical messages to be passed with minimal delay. The proposed changes are backward compatible with existing Ethernet systems, so legacy Ethernet systems will continue to work (but without the enhanced features). See IEEE 802.1 AVB/TSN, working group notes of the IEEE 802.1 Higher Layer LAN Protocols Working Group. https://1.ieee802.org.

The proposed 802.1 AVB/TSN standards, shown diagrammatically at 100 in FIG. 4, make augmentations and changes at the data link layer 86, to allow a suitably programmed Ethernet device, such as an Ethernet switch, to pass streams of data that need to be delivered under time-critical conditions. By virtue of the AVB/TSN augmentations and changes, these streams of data flow effectively as if they were being carried by circuit-switched point-to-point circuits, the conventional Ethernet frames being sent by non-time-critical systems. In effect, these new AVB/TSN augmentations and changes provide a mechanism to momentarily halt potentially interfering conventional Ethernet frames until the stream of time-critical data has passed through the switch.

To do this, the 802.1 AVB/TSN changes to the data link layer 86, incorporate a high accuracy clock that participating AVB/TNS Ethernet switches each have. By 802.1 AVB/TSN design, these clocks are all tightly synchronized, with one of the clocks serving as the grandmaster (GM), based on mutual performance of the IEEE 1588 best master clock algorithm (IEEE 802.1AS). By virtue of this clock synchronization, audio-video motion-picture data streams can be sent with highly accurate lip synch, and the phasing of sound from multiple loudspeakers can be tightly controlled.

As a result of employing these 802.1 AVB/TSN changes to the data link layer, the Ethernet switches support deterministic networking by improved OSI data link layer protocols that give priority to streaming traffic over frame-based traffic.

Reference may be had to the IEEE 802.1 AVB/TSN, working group notes of the IEEE 802.1 Higher Layer LAN Protocols Working Group, for a full discussion of these augmentations and changes to the data link layer 86. FIG. 4 sums up some of the key added components and features: a precision time protocol, a stream reservation protocol, an audio-video bridging (AVB) transport protocol and a real time protocol.

Incorporating IEEE 802.1 AVB/TSN into the Aircraft Modular Networking System

FIG. 5 shows the circuit details of the universal module 18. A 115 VAC power feed from the aircraft power bus 22 is converted into direct current (DC) by the DC converter 30. The converter supplies 57 VDC to the solid state circuit breakers 42, and also supplies 5 VDC to provide power to the microcontroller 32 and to other switching and control circuits and sensors within the module 18. The solid state circuit breakers 42 (one for each POE Ethernet circuit 38) provide the 57 VDC to a bank of digitally controlled circuit switches 102 (one for each POE Ethernet circuit). These switches are controlled by microcontroller 32. If desired, the circuit switches 102 can be manufactured as integral with the POE injector 40, or integral with the solid state circuit breaker 42.

Microcontroller 32 is programmed to cause the switches for each of the POE Ethernet circuits to remain closed, thus delivering 57 VDC to the POE injectors 40, unless conditions warrant that the voltage should be inhibited (thus turning off the affected Ethernet circuit). More specifically, microcontroller 32 is programmed to open and close the circuit switches 102 based on commands from the cockpit 24 (FIG. 10). The pilot or copilot might, for example, determine that power consumption by the in-flight entertainment or cabin systems needs to be reduced to conserve energy for other flight-critical uses. In such case a command may be entered into the flight management system 62, and communicated through the ARINC 429 data bus interface (discrete I/O bus 21) to microcontroller 32.

The microcontroller 32 is also preferably programmed to read various temperature, voltage and current sensors (collectively shown at 104), which may be located within the universal module 18. Temperature measurement may be made by suitable thermistor sensors or digital temperature sensors coupled to ports on the microcontroller. Current and voltage may be supplied from suitable points within the circuit shown in FIG. 5, such as from the converter 30, or from the solid state circuit breakers.

At the heart of the universal module 18 is the Ethernet switch 36, which has been equipped to utilize the IEEE 802.1 AVB/TSN augmentations and enhancements. Thus the Ethernet switch includes a processor 106 with deterministic networking programming 108 (e.g. AVB/TNS programming) and a reference clock 110, making the assembly be compliant with applicable IEEE 802.1 AVB/TSN standards, as needed to support the functionality disclosed herein. Attached to the Ethernet switch 36 are the respective POE Ethernet ports 38 and the optical Ethernet ports 34. It will be recalled that the POE Ethernet ports 38 are designed to communicate primarily with attached devices within the cabin, such as those illustrated in FIG. 3. The optical Ethernet ports 34 are designed to communicate with the fiber optic loop circuit 20 that ties all of the universal modules 18 together, as shown in FIG. 1.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment as contemplated herein. It should be understood that various changes may be made in the function and arrangement of elements described in an exemplary embodiment without departing from the scope of the invention as set forth in the appended claims.

What is claimed is:

1. A modular networking system for supplying data and aircraft power to an inflight entertainment, communication or cabin management device within an aircraft of the type having a passenger cabin, a cockpit, an aircraft power source, and an avionics system supplying control data, comprising:
   at least one universal module package for placement within the passenger cabin;
   an Ethernet switch disposed within the universal module package, the Ethernet switch having a processor programmed to support deterministic networking and further having at least one port adapted to attach to an inflight entertainment, communication or cabin management device;
   a power converter circuit disposed within the universal module package, the power converter circuit being adapted for coupling to receive aircraft power from the aircraft power source, the power converter circuit supplying output power at a current flow type and voltage corresponding to the power requirements of an attached inflight entertainment, communication or cabin management device;
   a power injector circuit disposed within the universal module package, the power injector circuit being coupled to the power converter circuit and to the Ethernet switch to supply power to an inflight entertainment, communication or cabin management device;
   a circuit switch disposed within the universal module package, operable to selectively admit or inhibit supply of power through the port to the attached inflight entertainment, communication or cabin management device; and
   a microcontroller disposed within the universal module package, the microcontroller being adapted to receive control data from the avionics system, and being further coupled to the circuit switch and programmed to operate the circuit switch to selectively admit or inhibit supply of power through the port to the attached inflight entertainment, communication or cabin management device in response to the received control data.

2. The modular networking system of claim 1 wherein the Ethernet switch has a second port adapted to attach to a second universal module package having disposed within a second Ethernet switch.

3. The modular networking system of claim 1 wherein the processor is programmed to support deterministic networking by enforcing at least one protocol selected from the group consisting of a precision time protocol, a stream reservation protocol, an audio video bridging transport protocol, and a real time protocol.

4. The modular networking system of claim 1 wherein the Ethernet switch further includes a reference clock and the processor is programmed to use the reference clock to enforce at least one protocol selected from the group consisting of a precision time protocol, a stream reservation protocol, an audio video bridging transport protocol, and a real time protocol.

5. The modular networking system of claim 1 wherein the processor is programmed to support deterministic networking by OSI data link layer protocols that give priority to streaming traffic over frame-based traffic.

6. The modular networking system of claim 1 wherein the power converter circuit receives alternating current from the aircraft power source and supplies output power as direct current.

7. The modular networking system of claim 1 wherein the power injector circuit receives power through a circuit breaker coupled to the power converter circuit.

8. The modular networking system of claim 1 wherein the Ethernet switch has a plurality of ports, each adapted to attach to a different inflight entertainment, communication or cabin management device.

9. The modular networking system of claim 8 further comprising a plurality of power injector circuits disposed within the universal module package, each of the plurality of power injector circuits supplying power to a different one of the plurality of ports.

10. The modular networking system of claim 1 wherein the power injector circuit supplies power to an attached inflight entertainment, communication or cabin management device using a cable attached between the port and the device, which cable also carries inflight entertainment, communication or cabin management data sourced or consumed by the device.

11. The modular networking system of claim 1 wherein the microcontroller includes a data bus interface adapted to connect to an aircraft data bus forming part of the avionics system.

12. The modular networking system of claim 11 wherein the aircraft data bus is an ARINC 429 data bus.

13. The modular networking system of claim 1 wherein the Ethernet switch further includes at least one optical Ethernet port adapted to interface with an optical Ethernet port of a second universal module package.

14. The modular networking system of claim 1 wherein the circuit switch is integral with the power injector circuit.

15. The modular networking system of claim 1 further comprising a circuit breaker that is integral with the power injector circuit.

16. The modular networking system of claim 1 further comprising condition sensor disposed within the universal module package that senses at least one of temperature, voltage and current and supplies a signal to the microcontroller.

* * * * *